US006359208B1

(12) United States Patent
Farnell, Jr.

(10) Patent No.: US 6,359,208 B1
(45) Date of Patent: Mar. 19, 2002

(54) GUITAR WITH PLASTIC FOAM BODY

(76) Inventor: Alfred D. Farnell, Jr., 1544 E. 1st St., Pomona, CA (US) 91766

( * ) Notice: Subject to any disclaimer, the term of this patent is extended or adjusted under 35 U.S.C. 154(b) by 0 days.

(21) Appl. No.: 09/704,503

(22) Filed: Nov. 1, 2000

Related U.S. Application Data

(60) Provisional application No. 60/167,376, filed on Nov. 24, 1999.

(51) Int. Cl.[7] .......................... G01D 1/08; G01D 3/00; G01H 3/18

(52) U.S. Cl. .......................... 84/726; 84/743; 84/267; 84/291

(58) Field of Search .................. 84/726–728, 743–746, 84/267, 291, 292

(56) References Cited

U.S. PATENT DOCUMENTS

| | | | | | |
|---|---|---|---|---|---|
| 2,968,204 | A | * | 1/1961 | Fender | 84/726 |
| 4,313,362 | A | * | 2/1982 | Lieber | 84/267 |
| 4,334,452 | A | * | 6/1982 | Morrison | 84/267 X |
| 4,738,178 | A | * | 4/1988 | Deering | 84/726 |

* cited by examiner

*Primary Examiner*—Stanley J. Witkowski

(74) *Attorney, Agent, or Firm*—Boniard L. Brown

(57) ABSTRACT

A stringed musical instrument or guitar has a plastic foam body substantially covered by a shell of thermoplastic material, a wood base on the plastic foam body, a plurality of strings supported to extend above the wood base, and at least one electromagnetic pick-up at the base. Musical vibrations produced by strumming the strings are conducted via the plastic foam body and wood base are largely sensed by the electromagnetic pick-up.

32 Claims, 3 Drawing Sheets

GUITAR WITH PLASTIC FOAM BODY

RELATED APPLICATIONS

Reference is made to my Provisional Application No. 60/167,376, filed Nov. 24, 1999, entitled "Guitar".

BACKGROUND AND SUMMARY OF THE INVENTION

Desirable characteristics for stringed instruments, such as base viols, cellos, guitars, and violins, etc., include the provision of sharp, clear tones, and substantial resonance.

Prior art guitars often do not produce such tones, and typically have resonance periods of only about 8 seconds.

The present invention provides a guitar having a polyurethane foam body and an interfitting hardwood base member, with a sound reservoir defined by a cavity in a hardwood member wherein a foam core is disposed, in which electromagnetic pick-ups are disposed.

The entire guitar is encased in a fiberglass shell, except for the sound reservoir, wherein the pick-ups are disposed. Resonance of about 28 seconds is produced. Substantially all musical notes produced by the strumming of the strings of the guitar are conducted via the hardwood and polyurethane foam components to exit the guitar via the sound reservoir.

DESCRIPTION OF THE PREFERRED EMBODIMENT

Figure 1:
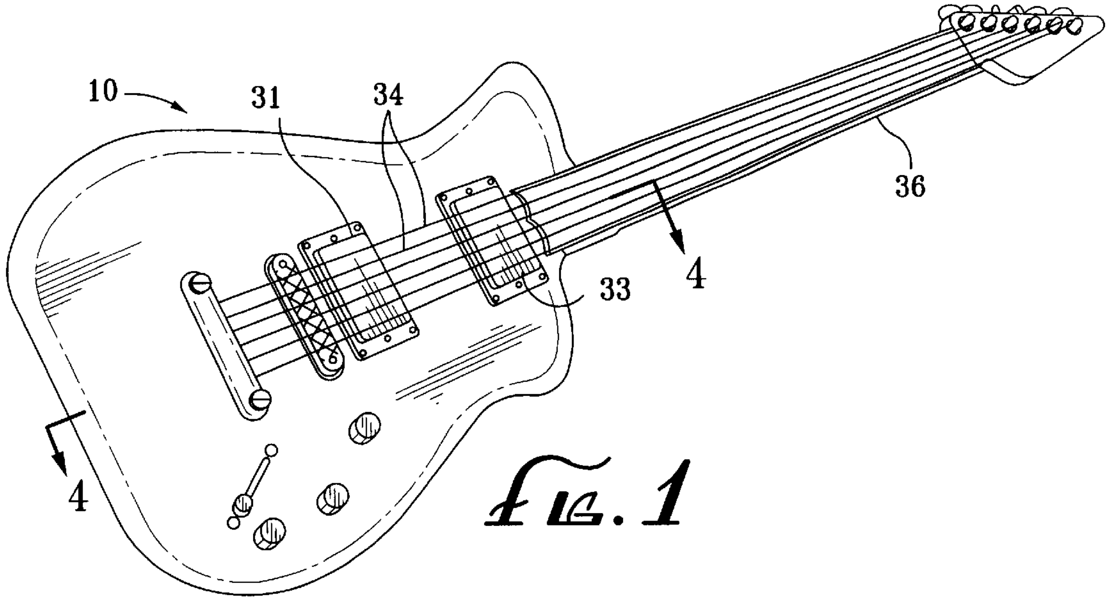
FIG. 1 is a top view of a guitar according to the invention.
Figure 2:
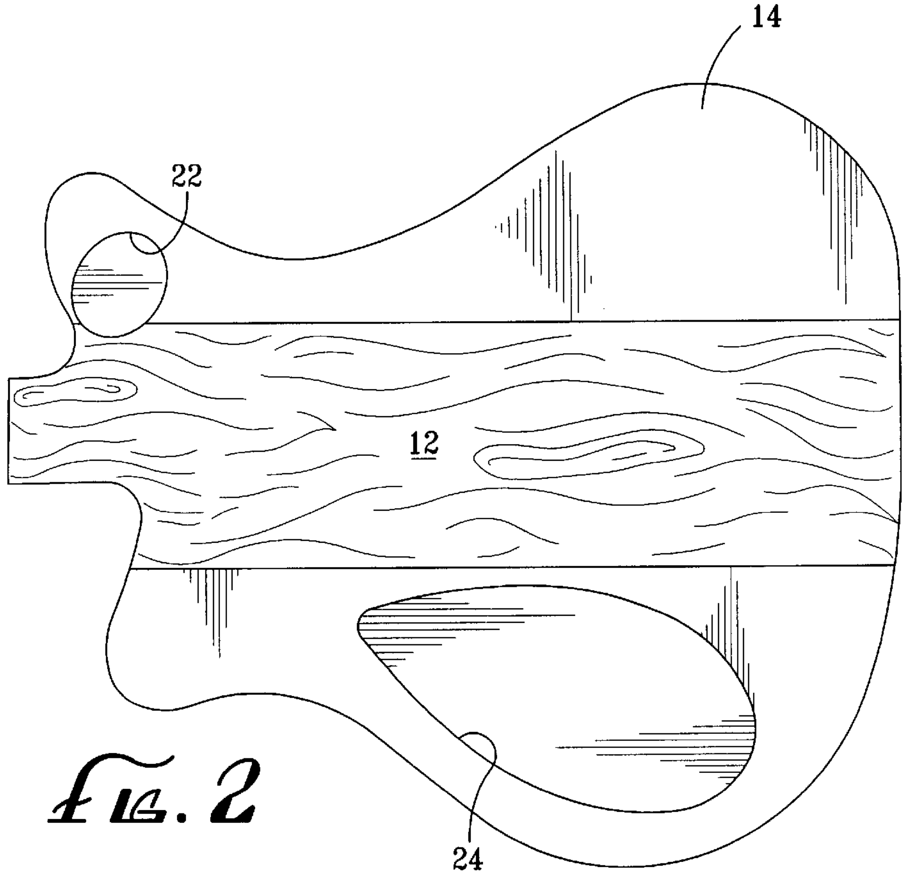
FIG. 2 is a bottom view of a body portion of the guitar of FIG. 1.
Figure 3:
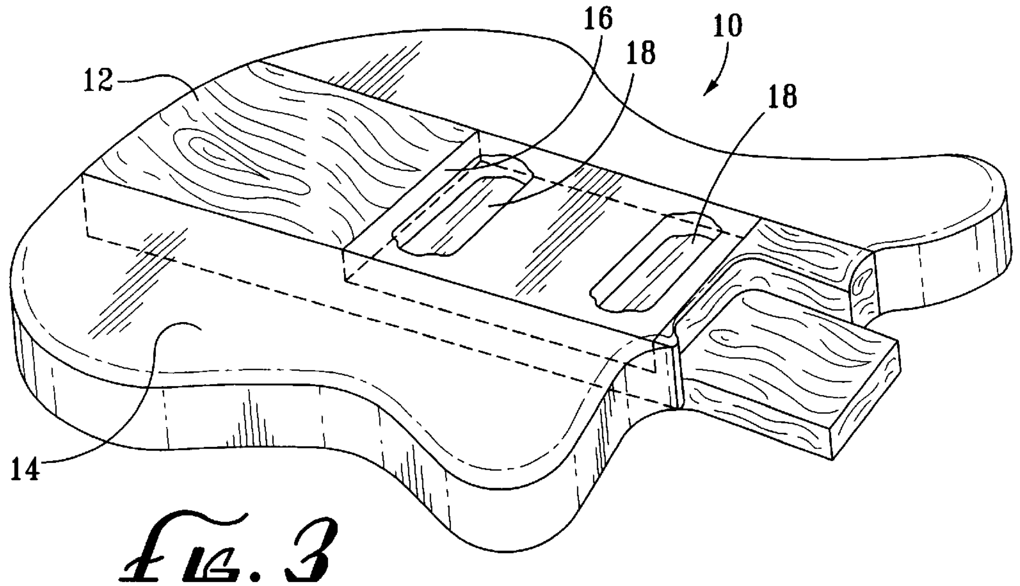
FIG. 3 is a perspective view of the guitar body of FIG. 2, showing the top of the body prior to assembly of operating components.

The present invention relates generally to stringed musical instruments, and in particular to guitar structures.

Referring to the drawings, a preferred embodiment 10 of the invention comprises a hardwood base member 12, preferably of mahogany, and a foam body 14, typically of high density closed cell polyurethane foam. As shown, hardwood base member 12 is interfitted with the foam body 14, in which a rectilinear cavity 16 is defined and which comprises a sound reservoir or resonator bay 18, wherein a core 20 of polyurethane foam is disposed. Although shown as rectilinear, the sound reservoir may be of different configurations, such as oval, circular, etc.

Defined in the foam body 14 are cavities to accommodate electronic components and connectors (not shown), a generally oval cavity 22 containing conventional three-way switch equipment (not shown), and a tear-shaped larger cavity 24 accommodating electronic components and connectors (not shown). The components in these cavities are preferably encased in polyester resin or the like.

Electromagnetic pick-ups 26, 28 are disposed in cavities in foam core 20 in the sound reservoir 18. Each pick-up has a casing thereabout. The pick-ups extend preferably about three-quarters the depth of the foam core 20. A plurality of pick-ups may be provided in each cavity (not shown), and various combinations of respective pick-up types may be utilized.

The pick-ups are covered by bezels 31, 33 to which they are connected. The bezels are mounted by threaded fasteners, and certain threaded fasteners (not shown) are rotatable for raising and lowering the pick-ups 26, 28 to provide desired sound effects.

Figure 4:
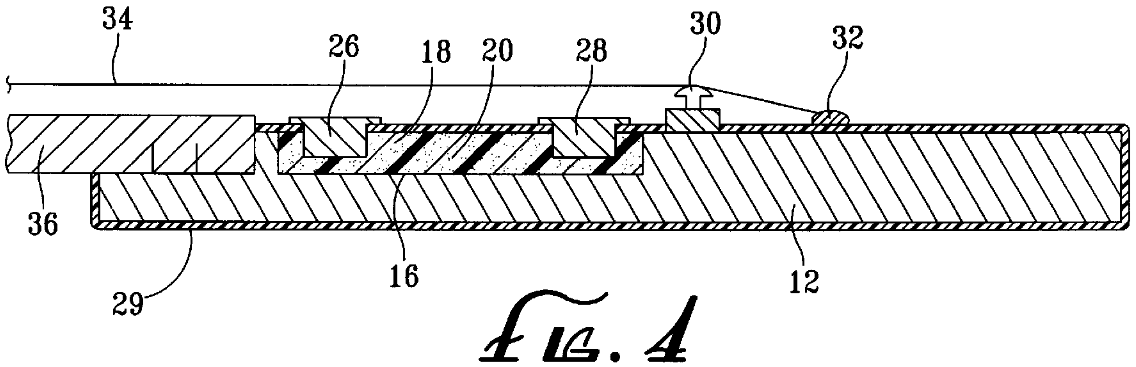
FIG. 4 is a sectional view taken at line 4—4 in FIG. 1.
Figure 5:
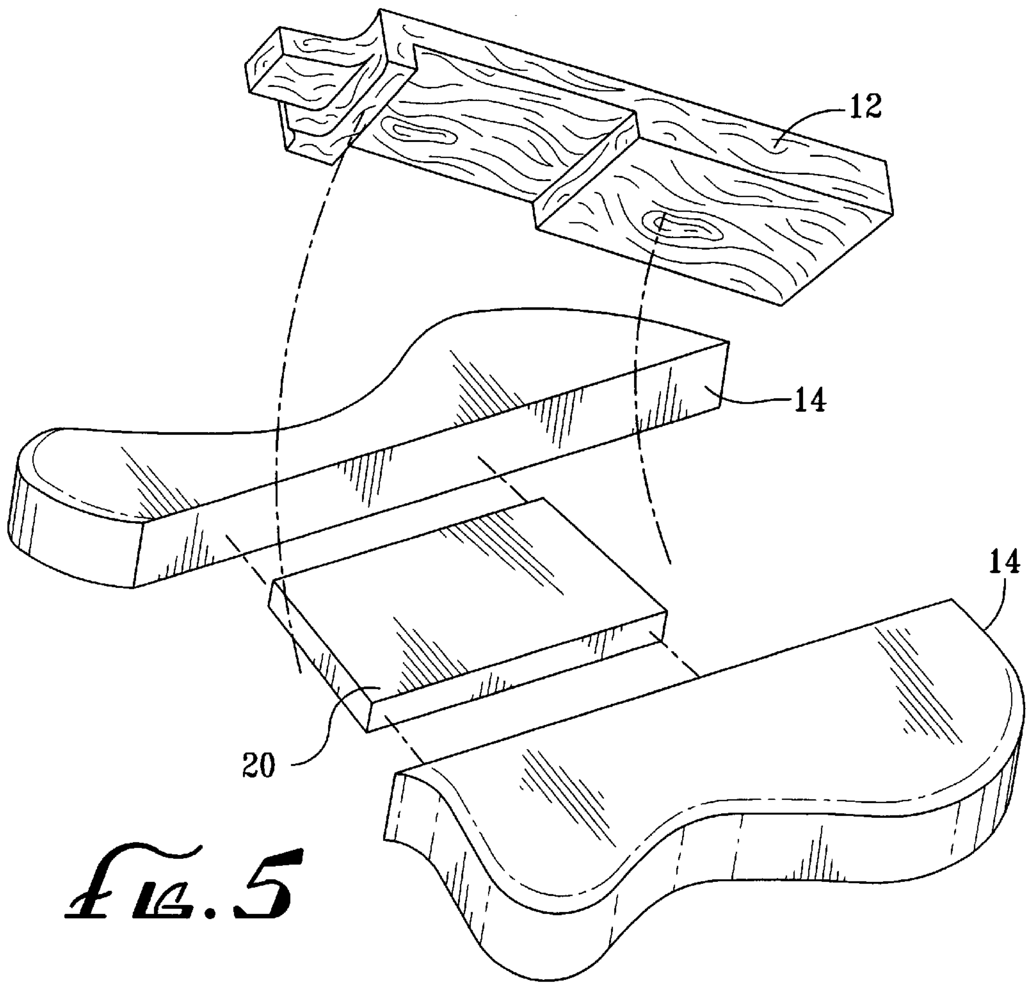
FIG. 5 is an exploded perspective view showing a foam insert of FIGS. 3 and 4 in relation to a hardwood base member.

The guitar is substantially entirely sealed, except for the sound reservoir 18, by being wrapped in fiberglass 29 (FIG. 4), typically fiberglass cloth or matting of preferably 3 oz. to 12 oz. weight. Carbon fiber or Kevlar might be utilized.

The sound reservoir is an important feature of the present invention. The guitar foam body being encased in a fiberglass shell, except for the sound reservoir, musical sounds and notes, cannot escape the guitar except by passing through the sound reservoir.

When the guitar strings 34 are strummed at neck 36, the musical tones produced pass via the bridge 30 and tail piece 32 into the hardwood base member 12, and thence to the foam care 14 in the sound reservoir, and to the pick-ups. The musical sounds have essentially no exit from the guitar except via the sound reservoir and the pick-ups. All other areas or exits are sealed and closed by the fiberglass shell 29.

The polyester foam body 14 is secured to the interfitting hardwood base member 12 by a hard adhesive, because a soft adhesive would absorb musical sounds, and it is desired to provide as brittle musical tones as possible. The surfaces of the polyester foam are not coated with adhesive or other coating.

The fiberglass shell 29 provides strength, rigidity, and also provides clear, high-end frequency, bright tones. The hardwood base member 12 provides rich, dark tones, or bottom end bass tones.

The foam components typically of 4–8 lb. density, provide sustained resonance and a resonant quality whereby each note reverberates for a substantial period of time, without electrical amplification, thus to provide increased duration of resonance.

It is believed that the cumulative effect of the vast number of foam cells, expanding and contracting somewhat in the manner of miniature diaphragms, generate tiny audible pulses in response to musical vibrations. The cells are closed-cell foam plastic, preferably polyurethane foam, and vibrations or air pressure waves pass from one closed cell to adjacent closed cells via cell walls. The cumulative effect is to produce resonant, audible output via the pick-up devices, air trapped in the cells of the plastic foam being alternately pressurized and depressurized in accordance with musical tones and notes generated, according to the invention. The foam body typically has a density of 4–8 lbs. to provide sustained resonance and a resonant quality, whereby each note vibrates for a substantial time period without electrical amplification.

Figure 6:
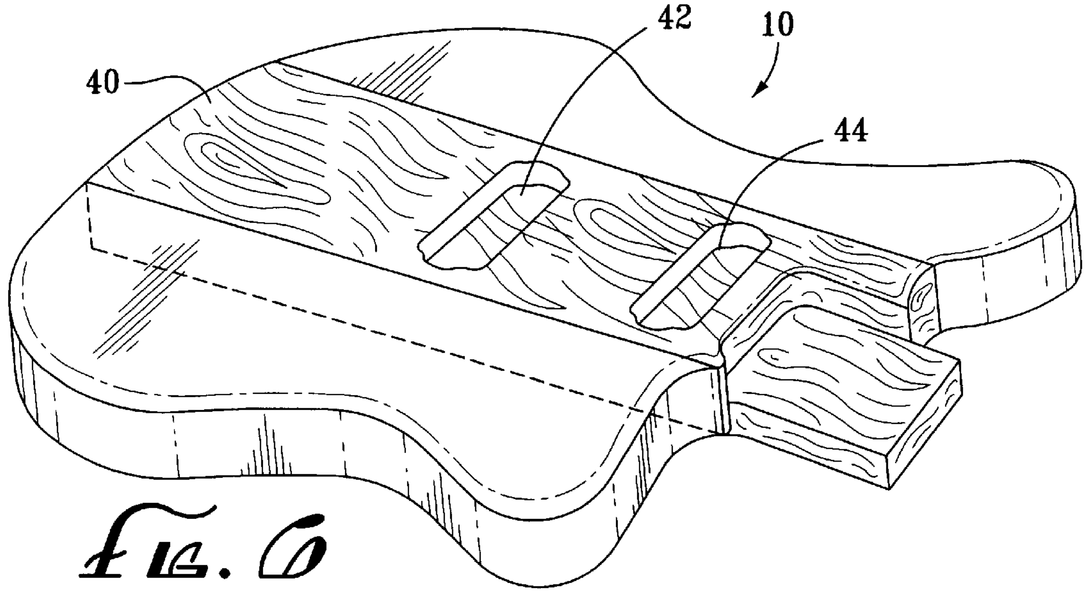
FIG. 6 is a perspective top view of a modified embodiment of the invention.

FIG. 6 illustrates a modified form of the invention wherein a wood base member 40 has defined therein two cavities 42, 44 wherein electromagnetic pick-ups or transducers are mounted (not shown). No foam member is provided in either cavity, and the pick-ups or transducers are in direct contact with wood base member 40. Musical notes are transmitted through the foam body and the wood to the pick-up transducers.

It will be understood that various changes and modifications may be made from the preferred embodiment discussed above without departing from the scope of the present invention, which is established by the following claims and equivalents thereof.

The inventor claims:

1. A stringed musical instrument, comprising:

a plastic foam body, a shell of thermoplastic material disposed substantially about said foam body to retain musical vibrations in the body, a wood base disposed on the plastic foam body, a plurality of strings supported to extend above the wood base, and at least one electromagnetic pick-up mounted on said wood base to sense musical vibrations produced by strumming the strings and conducted via the plastic foam body and the wood base for conversion into musical sounds.

2. A musical instrument according to claim 1, wherein the plastic foam body comprises polyurethane closed-cell foam.

3. A musical instrument according to claim 1, wherein said wood base comprises mahogany wood.

4. A musical instrument according to claim 1, wherein said strings extend across support members comprising a bridge and a fret.

5. A musical instrument according to claim 1, wherein:

at least two electromagnetic pick-ups are disposed in the wood base to receive and transmit musical vibrations received by the plastic foam body and the wood base to conduct musical vibrations to audible output speaker means.

6. A musical instrument according to claim 1, wherein musical vibrations produced by strumming of said strings are conducted by the foam body and wood base to exit the guitar via the at least one electromagnetic pick-up.

7. A musical instrument according to claim 1, wherein substantially all musical vibrations can exit the musical instrument only via the at least one electromagnetic pickup.

8. A musical instrument according to claim 1, wherein the thermoplastic material disposed about the foam body comprises fiberglass.

9. A musical instrument according to claim 1, wherein the plastic foam body comprises polyurethane closed-cell foam.

10. A musical instrument according to claim 1, wherein said plastic foam has a density of 4–8 lbs.

11. A musical instrument according to claim 1, wherein cells of the plastic foam body alternately pressurize and de-pressurize to transmit musical vibrations.

12. A stringed musical instrument comprising:

a plastic foam body, a wood blase on the plastic foam body, a plurality of strings and supported to extend above the wood base, at least one cavity defined in the wood base, and at least one electromagnetic pick-up disposed at said at least one cavity in the wood base, said electromagnetic pick-up being connected with output speaker means, whereby vibrations of the strings produce musical vibrations which are conducted by the plastic foam body and the wood base and are sensed by the at least one electromagnetic pick-up for conversion into musical sounds.

13. A musical instrument according to claim 12, wherein the plastic foam body comprises polyurethane closed-cell foam.

14. A musical instrument according to claim 12, wherein said cavity is defined in an upper portion of the wood base.

15. A musical instrument according to claim 12, wherein:

at least two electromagnetic pick-ups are disposed in the wood base to receive and to transmit musical vibrations received via the plastic foam body and the wood base to conduct musical vibrations to audible output speaker means.

16. A musical instrument according to claim 12, wherein substantially all musical vibrations can exit the guitar only via said at least one electromagnetic pick-up.

17. A musical instrument according to claim 12, wherein the thermoplastic material disposed about the foam body comprises fiberglass.

18. A stringed musical instrument according to claim 12, wherein the thermoplastic material is mounted on the foam body by wrapping the material about the foam body.

19. A stringed musical instrument according to claim 12, wherein the plastic foam body comprises polyurethane closed-cell foam.

20. A stringed musical instrument according to claim 12, wherein said wood base comprises mahogany wood.

21. A stringed musical instrument according to claim 12, wherein said plastic foam has a density of 4–8 lbs.

22. A musical instrument according to claim 12, wherein:

the plastic foam body generally comprises closed plastic foam cells to expand and contract with musical vibrations to produce pulses in response to vibratory motion which pass from one closed cell to adjacent cells via cell walls, whereby the cells produce enhanced resonant audible output via the electromagnetic pick-up via the at least one electromagnetic pick-up device.

23. A guitar, comprising:

a plastic foam body, a wood base disposed at least partially in the plastic foam body, at least one cavity defined in the wood base, a plastic foam core disposed in said at least one cavity, and at least one electromagnetic pick-up disposed at said foam core in the at least one cavity to receive musical vibrations via the plastic foam body, wood base, and foam core, said electro-magnetic pick-up being connected with an audible output system.

24. A musical instrument according to claim 23, wherein said strings extend across support members comprising a bridge and a fret.

25. A musical instrument according to claim 23, wherein musical vibrations produced by strumming of said strings are conducted by the foam body and wood base to exit the guitar via said at least one electromagnetic pick-up.

26. A musical instrument according to claim 23, wherein at least two electromagnetic pick-ups are disposed in cavities in the foam core.

27. A musical instrument according to claim 23, wherein the thermoplastic material disposed about the foam body comprises fiberglass.

28. A musical instrument according to claim 23, wherein said plastic foam body comprises closed-cell foam plastic.

29. A musical instrument according to claim 23, wherein said plastic foam has a density of about 4–8 lbs.

30. A musical instrument according to claim 23, wherein the foam core is adhesively secured in said at least one cavity toy hard adhesive for improved transmission of musical vibrations.

31. A musical instrument according to claim 23, wherein the plastic foam body comprises cells alternately pressurized and de-pressurized to transmit musical vibrations.

32. A stringed instrument according to claim 23, wherein said plastic foam body comprises cells which expand and contract with musical vibrations to produce pulses in response to vibratory cell wall motions which pass from one closed cell to adjacent cells via cell walls, whereby the cells produce enhanced resonant audible output via the electro-magnetic pick-up device.

* * * * *

UNITED STATES PATENT AND TRADEMARK OFFICE
CERTIFICATE OF CORRECTION

PATENT NO. : 6,359,208 B1
DATED : March 19, 2002
INVENTOR(S) : Alfred D. Farnell, Jr.

It is certified that error appears in the above-identified patent and that said Letters Patent is hereby corrected as shown below:

Column 5,
Line 1, delete "toy" and insert -- by --.

Signed and Sealed this

Third Day of September, 2002

*Attest:*

JAMES E. ROGAN
*Director of the United States Patent and Trademark Office*

*Attesting Officer*